United States Patent [19]
Maron et al.

[11] Patent Number: 5,957,551
[45] Date of Patent: Sep. 28, 1999

[54] PROCESS AND DEVICE FOR ACTUATING A BRAKING SYSTEM DURING THE STARTING OF A MOTOR VEHICLE

[75] Inventors: Christof Maron, Gehrden; Hubertus Prinzler, Langenhagen; Thomas Dieckmann, Pattensen, all of Germany

[73] Assignee: Continental Aktiengesellschaft, Hannover, Germany

[21] Appl. No.: 08/796,948

[22] Filed: Feb. 7, 1997

[30] Foreign Application Priority Data

Feb. 10, 1996 [DE] Germany .................... 196 04 946

[51] Int. Cl.⁶ ............................................. B60T 8/32
[52] U.S. Cl. ..................... 303/191; 303/15; 303/20
[58] Field of Search .................... 180/65.2, 65.3, 180/65.5; 188/156, 158, 161, 162, 265; 318/139, 362, 371, 376; 320/162, 163; 364/423.098, 424.026, 424.034, 424.038; 701/29, 33

[56] References Cited

U.S. PATENT DOCUMENTS

| | | | |
|---|---|---|---|
| 3,584,921 | 6/1971 | Crawford | 303/20 |
| 3,731,168 | 5/1973 | Strifler | 318/139 |
| 3,907,071 | 9/1975 | Wells | 188/312 |
| 4,398,252 | 8/1983 | Frait | 364/426.04 |
| 4,629,043 | 12/1986 | Matsuo et al. | 188/2 D |
| 4,644,180 | 2/1987 | Wickham | 188/156 |
| 4,708,406 | 11/1987 | Takagi et al. | 303/116.1 |
| 4,824,178 | 4/1989 | Peterson | 303/15 |
| 5,499,866 | 3/1996 | Brugger et al. | 303/122.08 |
| 5,508,594 | 4/1996 | Underwood et al. | 318/139 |
| 5,549,364 | 8/1996 | Mayr-Fröhlich et al. | 303/9.69 |
| 5,596,261 | 1/1997 | Suyawa | 320/48 |
| 5,730,243 | 3/1998 | Koike et al. | 180/220 |

FOREIGN PATENT DOCUMENTS

| | | |
|---|---|---|
| 0181763 | 5/1986 | European Pat. Off. . |
| 0212074 | 3/1987 | European Pat. Off. . |
| 3502100 | 7/1986 | Germany . |
| 3527907 | 2/1987 | Germany . |
| 4218717 | 12/1993 | Germany . |
| 4338064 | 3/1995 | Germany . |
| 19540265 | 4/1997 | Germany . |

*Primary Examiner*—Chris Schwartz
*Attorney, Agent, or Firm*—Greenblum & Bernstein, P.L.C.

[57] ABSTRACT

A process and device for starting a motor vehicle having a braking system in which a brake force is at least partially supplied by at least brake energy storage devices. Prior to starting a motor vehicle, the vehicle is initially switched into a non-drivable state in which the vehicle is disabled from movement. A charging state of each brake energy storage device may be checked to ensure an adequate charging state. If the charging state of at least one of the brake energy storage devices is greater than or equal to a predetermined minimum charging state, the vehicle may be switched into a drivable state and, thus, operable by the driver.

28 Claims, 4 Drawing Sheets

PROCESS AND DEVICE FOR ACTUATING A BRAKING SYSTEM DURING THE STARTING OF A MOTOR VEHICLE

CROSS-REFERENCE OF RELATED APPLICATION

The present invention claims the priority under 35 U.S.C. §119 of German Patent Application No. 196 04 946.6 filed on Feb. 10, 1996, the disclosure of which is expressly incorporated by reference herein in its entirety.

BACKGROUND OF THE INVENTION

1. Field of the Invention

The present invention may be directed to a process for starting a motor vehicle having a braking system that obtains brake actuation energy at least partially from brake energy storage devices. A charging state for each brake energy storage device may be checked when the motor vehicle is started. The invention may also be directed to a motor vehicle having a braking system that obtains brake actuation energy at least partially from brake energy storage devices, and having a testing device for checking the charging state of the brake energy storage devices.

2. Discussion of Background Information

Braking systems, particularly those utilized in passenger motor vehicles, have been developed which are of the brake-by-wire type. In braking systems of this kind, an amount of braking desired by the driver is translated from a foot force exerted on a brake pedal, and the exerted foot force is detected by a sensor and converted into an electrical signal. The signal is transmitted to brake actuators associated with a particular wheel of the motor vehicle, and each brake actuator exerts a braking force on the vehicle wheel with the assistance of an electromotor. Thus, the brake actuation energy required for performing a braking procedure is not mechanically supplied, as in conventional brake systems, but is electrically supplied. Accordingly, electrical brake energy storage devices must be supplied to enable the supply of electrical energy to the braking system to perform the desired braking procedure. In this regard, part of the energy supplied to the braking system can come from the normal wiring system of the vehicle and another part of the supplied energy, which would overload the normal wiring system, comes from separate brake energy storage devices. A brake system substantially similar to the above-described system is described in the Applicants' German Patent Application No. 195 40 265.0, the disclosure of which is incorporated by reference. Alternatively, the electrical energy required for the brake system may be exclusively supplied by a separate brake energy storage device. Thus, a sufficient charging state of the separate brake energy storage devices is particularly important to the safety of the braking system. For this reason, the charging state of the brake energy storage devices has to be continuously checked, particular when the vehicle is started.

A brake system with electrically controllable brake devices has been disclosed in DE 35 02 100 A1. The system includes a first energy storage device for normal operation and a second energy storage device for emergency operation. Both brake energy storage devices are associated with a voltage monitoring device to continuously check the charging state of the brake energy storage devices. If an insufficient charging state level (amount) is detected in the first energy storage device to perform normal operation, then a change-over device switches the system over to the second energy storage device for emergency operation. The first energy storage device is switched over to be charged by a generator. The changeover to emergency operation is optically or acoustically indicated to the driver of the vehicle with a signal transmitter.

The charging state of the first energy storage device is also checked when the vehicle is started. When the charging state is found insufficient, the above-mentioned signal transmitter indicates this state to the driver and the braking system is then switched over to the second energy storage device to utilize its energy supply. If the second energy storage device has an insufficient charging state, then the signal transmitter indicates this state to the driver.

According to DE 35 02 100 A1, an additional safety is produced by checking the charging state of the brake energy storage device of the braking system and by providing a second energy storage device. The process for starting a vehicle disclosed in the above-noted document relates to a passive process, since the charging state of the energy storage device for normal operation or the charging state of the energy storage device for emergency operation is only optically or acoustically indicated to the driver. The safety of the vehicle, therefore, is not actively increased by this starting process.

SUMMARY OF THE INVENTION

An object of the present invention is to create a process for starting a motor vehicle having a braking system that obtains brake actuation energy at least partially from brake energy storage devices which actively increases the safety of the vehicle over the above-noted drawbacks of the prior art. It is also an object of the present invention to produce a motor vehicle with a braking system that obtains brake actuation energy at least partially from brake energy storage devices to carry out the process.

In accordance with the present invention, the process for starting a motor vehicle may include automatically transferring the vehicle into a non-drivable state prior to checking a charging state level or amount of each brake energy storage device, checking the charging state of the brake energy storage devices, and transferring the vehicle into a drivable state if a measured charging state of at least one of the brake energy storage devices is greater than or equal to a predetermined minimum charging state.

In accordance with the present invention, the motor vehicle may include a switch that automatically switches the motor vehicle into a non-drivable state, a control device, which includes a charging state measuring device, compares a charging state of each brake energy storage device with a predetermined minimum charging state, and a switchover device that switches the vehicle into a drivable state when the measured charging state of at least one of the brake energy storage devices is greater than or equal to the predetermined minimum charging state.

In the present disclosure, the term "non-drivable" may be understood to mean a state in which a motor vehicle is technically in order but in which a component required for driving the vehicle is purposefully disengaged, e.g. the transmission, or in which the vehicle is purposefully blocked from being drivable, e.g. by setting the parking brake.

In accordance with the present invention, the non-drivable state of a motor vehicle may be achieved (or set) prior to checking the charging state. As a result, the active safety of the motor vehicle during starting is distinctly increased. For example, a "consequence" (result) of a positive check of the charging state is the switchover of the motor vehicle into a drivable state. If, however, this "consequence" is suppressed for any reason, then the vehicle remains in the non-drivable state and is, therefore, safe. The increase in active safety through the process of the present invention is particularly pronounced when the process is compared to a process in which a negative check of a charging state transfers the vehicle from a drivable state into a non-drivable state. Thus, if this negative result is suppressed for any reason, then the vehicle remains in a drivable state despite the negative check indicative of brakes that cannot be used or that can only be used to a limited degree.

A particular advantage of the process according to the invention for starting the vehicle is that it may be performed automatically and cannot be influenced by actions of the driver. That is, the process may be non-overridable, i.e., the process cannot be "overridden" by the driver to transfer the vehicle into a drivable state despite the fact that the brakes cannot be used or can only be used to a limited degree. A switchover of the vehicle into the non-drivable state may preferably take place automatically when the vehicle is turned off.

According to the process of the present invention, a recharging of the brake energy storage devices may occur when a check detects an insufficient charging state and the vehicle may be transferred into a drivable state if, after recharging, at least one of the brake energy storage devices has attained a predetermined minimum charging state. This recharging of the brake energy storage devices can be performed by an external energy source or by a generator of the vehicle.

To recharge the brake energy storage device via a generator of the vehicle, the motor of the vehicle should preferably be running. A recharging of the brake energy storage devices via an internal generator of the vehicle has the added advantage that, when the brake energy storage devices have an insufficient charging state, the recharging may be performed without needing service personnel.

According to another feature of the process of the present invention, the vehicle may be switched over into a non-drivable state by switching an immobilizer into a currentless (non-current carrying) state and the vehicle may be switched over into the drivable state by switching the immobilizer into a current carrying state. The switchover of the vehicle into the non-drivable state may occur automatically before checking the charging state of the brake energy storage devices and preferably when the vehicle is turned off.

According to another feature of the process of the present invention, the immobilizer may be an electrical parking brake that is automatically transferred into a currentless state when the vehicle is turned off, thus, immobilizing the vehicle. This feature achieves the further advantage that immobilizer, used to produce the non-drivable state, may be already be a component of the vehicle. Additionally, this feature may prevent unwanted rolling of the vehicle during starting.

According to another feature of the present invention, the immobilizer may be a transmission lock that may be automatically transferred into a currentless state when the vehicle is shut off. Transmission locks generally known in the prior art may be utilized as an immobilizer. If automatic transmissions are shifted, for example, into position "P" for park, a mechanical ratchet lock is engaged which blocks the transmission. This mechanically actuated transmission lock may be embodied as an electrically actuated device in which a currentless state may create a locked state of the transmission.

The present invention may be directed to a method for disabling a brake lock in a motor vehicle upon starting of the motor vehicle. The brake lock may be actuated prior to starting of the motor vehicle and the motor vehicle may include at least one brake energy storage device and a control device. The method may include measuring a charging state level of each brake energy storage device; comparing each measured charging state level to a predetermined minimum charging state level; and disabling the brake lock when at least one of the measured charging state levels is at least equal to the predetermined minimum charging state level.

In accordance with another feature of the present invention, when the measured charging state level of each of the at least one brake energy storage devices is less than the predetermined minimum charging state level, the method may further include recharging each brake energy storage device; measuring each recharged charging state level; comparing each recharged charging state level to the predetermined minimum charging state level; and disabling the brake lock when at least one of the recharged charging state levels is at least equal to the predetermined minimum charging state level.

In accordance with still another feature of the present invention, the method may also include disabling the brake lock when each measured charging state level is at least equal to the predetermined minimum charging state level. Further, the disabling may include applying a predetermined voltage to the brake lock; reducing a friction force applied to a brake actuator; and releasing a brake disk.

In accordance with yet another feature of the present invention, the brake lock may include an electromagnetic friction slip coupling device having a friction head and the reducing the friction force may include withdrawing the friction head from a spindle nut.

In accordance with a further feature of the present invention, once disabled, the brake lock may remain disabled until the motor vehicle is turned off.

In accordance with a still further feature of the present invention, the method may also include initially actuating the brake lock by turning off the motor vehicle.

The present invention may be directed to a motor vehicle having a braking system that includes a brake lock that is enabled upon starting the motor vehicle, and the motor vehicle may be locked until the brake lock is disabled. The vehicle may include a switching device coupled to the brake lock that enables and disables the brake lock; at least one brake battery; a charging state measuring device for measuring a charging state of each brake battery; a control device that compares the measured charging state level to a predetermined minimum charging state level; and a control device coupled to the switching device for transmitting a control signal to the switching device to one of enable and disable the brake lock.

In accordance with a further feature of the present invention, the control device may include a comparator and the switching device may include an electromagnetic friction slip coupling device having a coil.

In accordance with a still further feature of the present invention, the switching device may be disabled by a current applied to the coil.

In accordance with another feature of the present invention, the vehicle may further include a recharging device that recharges brake batteries having a charging state level below the predetermined minimum charging level.

In accordance with yet another feature of the present invention, the brake lock may include an electromagnetic device having friction head and a spindle nut. During enabling of the brake lock, the friction head may be spring biased against a surface of the spindle nut to restrict movement thereof. During disabling of the brake lock, the friction head may be biased toward the electromagnetic device to allow unrestricted movement of the spindle nut.

Other exemplary embodiments and advantages of the present invention may be ascertained by reviewing the present disclosure and the accompanying drawing.

BRIEF DESCRIPTION OF THE DRAWINGS

The present invention may be further described in the detailed description which follows, in reference to the noted plurality of drawings by way of non-limiting examples of preferred embodiments of the present invention, in which like reference numerals represent similar parts throughout the several views of the drawings, and wherein.

DETAILED DESCRIPTION OF THE PREFERRED EMBODIMENTS

The particulars shown herein are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for the fundamental understanding of the invention, the description taken with the drawings making apparent to those skilled in the art how the invention may be embodied in practice.

Figure 1:
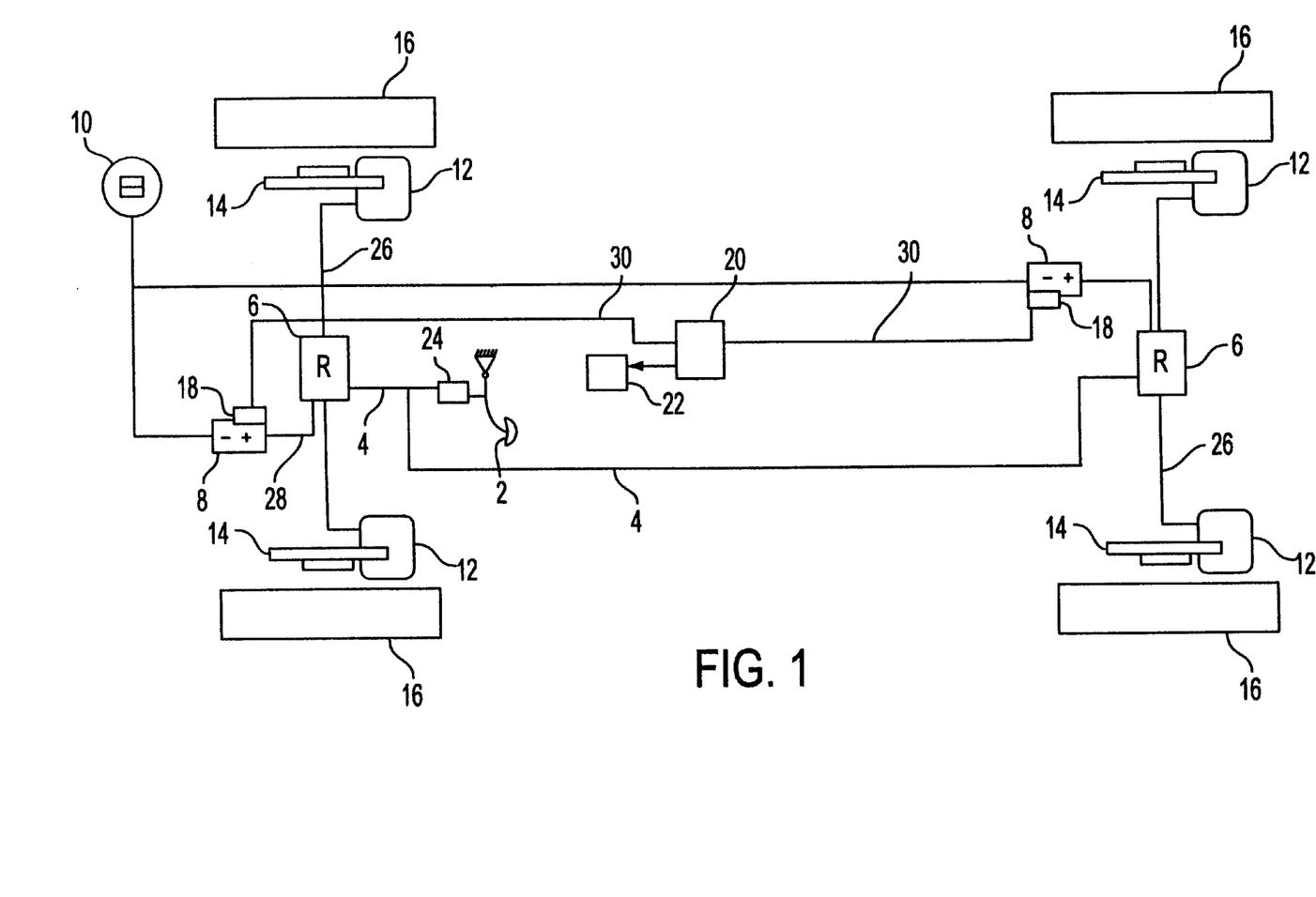
FIG. 1 illustrates a schematic representation of a braking system for a motor vehicle.

FIG. 1 illustrates a schematic representation of a braking system for a motor vehicle in which energy, e.g., electrical energy, utilized for performing a braking procedure may be supplied from brake energy storage devices. A vehicle driver determines an amount of desired braking by exerting a foot force on a brake pedal 2.

A sensor 24 may be positioned to detect the path covered by brake pedal 2 upon the application of foot force. Sensor 24 may convert the detected path into an electrical signal corresponding to the driver's amount of desired braking. Sensor 24 may transmit a signal to control units 6 through respective lines 4. A respective control unit 6 may be associated with each of the front and rear axles of the vehicle to convert the sensor signal into a control signal to control the braking procedure. Control units 6 may transmit control signals to respective brake actuators 12 through lines 26.

Each brake actuator 12 may exert a brake application force, in accordance with the control signal from control unit 6, on a respective brake disk 14. The brake application force may be applied through an electrically driven brake application device, discussed below, which may produce a braking action at each of the wheels 16. Each brake actuator 12 may receive all, or at least a portion, of the electrical energy necessary to perform a braking operation from brake energy storage devices 8, e.g., brake batteries. Each axle of the vehicle may have a brake energy storage device 8 associated therewith to supply the brake actuator 12. Brake storage device 8 may be coupled to either or both brake actuators 12 associated with the respective axle of the vehicle. That is, brake energy storage device 8 may communicate directly with control units 6 through electrical lines 28 and, through lines 26 from control unit 6, to brake actuators 12. When only a portion of the electrical energy is supplied via the brake energy storage devices 8, the remaining portion may be supplied from the vehicle's wiring system 10, which may communicate with brake actuators 12 in a similar manner to the brake energy storage device 8.

Whether or not the braking energy for a braking operation is fully or partially supplied from brake energy storage devices 8, safe braking of the vehicle may only be possible when brake energy storage devices 8 are included. Accordingly, at least one of the brake energy storage devices 8 should have a sufficient minimum charging state to properly actuate brake actuators 12. Particularly, when starting the vehicle, the brake energy storage devices 8 should be tested to ensure that a sufficient charging state exists. That is, when the vehicle has not been run or operated for an extended period of time, partial discharging of the brake energy storage devices 8 may occur, resulting in an improper charging level for actuating brake actuators 12. Brake energy storage devices 8 may be coupled to charge state sensors 18, for checking the charging state. Charge state sensors 18 may transmit a result of charging state detection (or check) to a control device 20 via lines 30. Control device 20 may assess whether the charging state of at least one of the brake energy stores 8 has a sufficient magnitude or level to safely operate the braking system of the vehicle. If a sufficient level is detected, an immobilizer 22, activated by a signal from control device 20 prior to checking the charging state to switch the vehicle into a non-drivable state, may be "released" via another signal from control device 20. The vehicle is now in a drivable state and operable by the driver. Conversely, if an insufficient level is detected, control device 20 will not send a second signal to immobilizer 22 to release the vehicle. Thus, if the charging state is inadequate, then the vehicle will remain in the non-drivable state and, thus, be inoperable by the driver.

Figure 2:
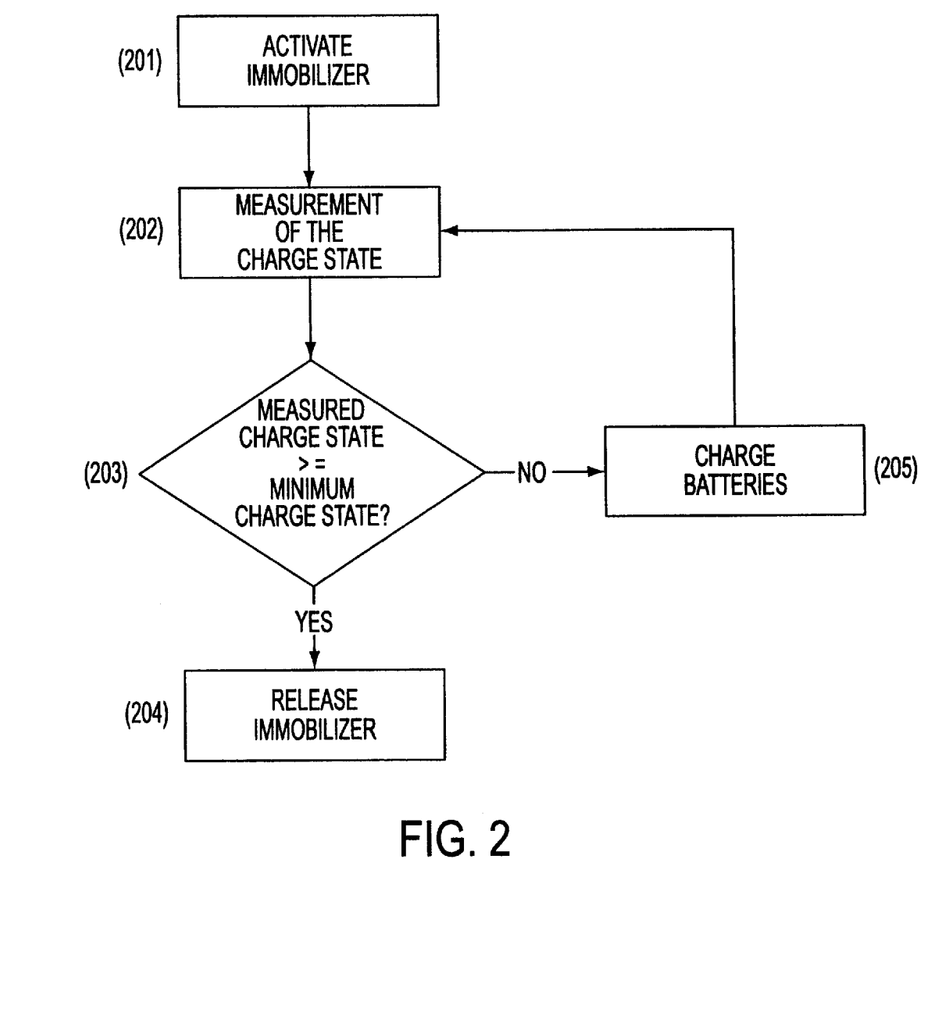
FIG. 2 illustrates a flow diagram of an exemplary procedure for enabling starting of the motor vehicle.

FIG. 2 illustrates an exemplary flow diagram of the process for starting a motor vehicle in accordance with the present invention. At step 201, the vehicle may be automatically switched into a non-drivable state, e.g., via actuation of an immobilizer. In accordance with the present invention, the actuation of the immobilizer may be automatically effected prior to the starting process, e.g., when the vehicle was previously turned off.

After it is determined that the vehicle is in a non-drivable state, a measurement of the charging state of the brake energy storage devices 8 may occur through the charge state sensors 18 at step 202. The result of the charging state measurement may be transmitted to control device 20. At step 203, the process, via control device 20, determines whether the measured charging state is greater than or equal to a predetermined minimum charging state that may be stored within a memory storage device in control device 20. Further, control device 20 may include a comparator device to carry out a comparison of the measured charging state to the predetermined value. When a positive result is found, i.e., at least one of the brake energy storage devices 8 is greater than or equal to the predetermined minimum charging state, the vehicle may be safely switched over to the drivable state. Accordingly, control device 20, at step 204, may transmit a signal to the immobilizer to effectuate a release. The process for safely starting the vehicle can be further enhanced by alternatively adjusting the process to include an additional step of transferring the vehicle into the drivable state only if each brake energy storage device 8 is found to meet or exceed the predetermined minimum charging state.

Conversely, when a negative result is found, i.e., the measured charging state of each brake energy storage device 8 is found to be lower than the predetermined minimum charging state, the brake energy storage devices 8 may be recharged at step 205. The recharging process can be carried out by either a vehicle-based generator or an external recharging device. The recharged charging state of the brake energy storage devices 8 may be measured at step 202. The result of the charging state measurement may be transmitted to control device 20 for comparison with the predetermined minimum charging state at step 203. A loop including steps 202, 203, and 205 may be repeated as necessary until the measured charging state of at least one brake energy storage device 8 enables a positive result from control device 20. Upon transmission of the positive result to immobilizer 22, the immobilizer may be released, thus, switching the vehicle into its drivable state.

Figure 3A:
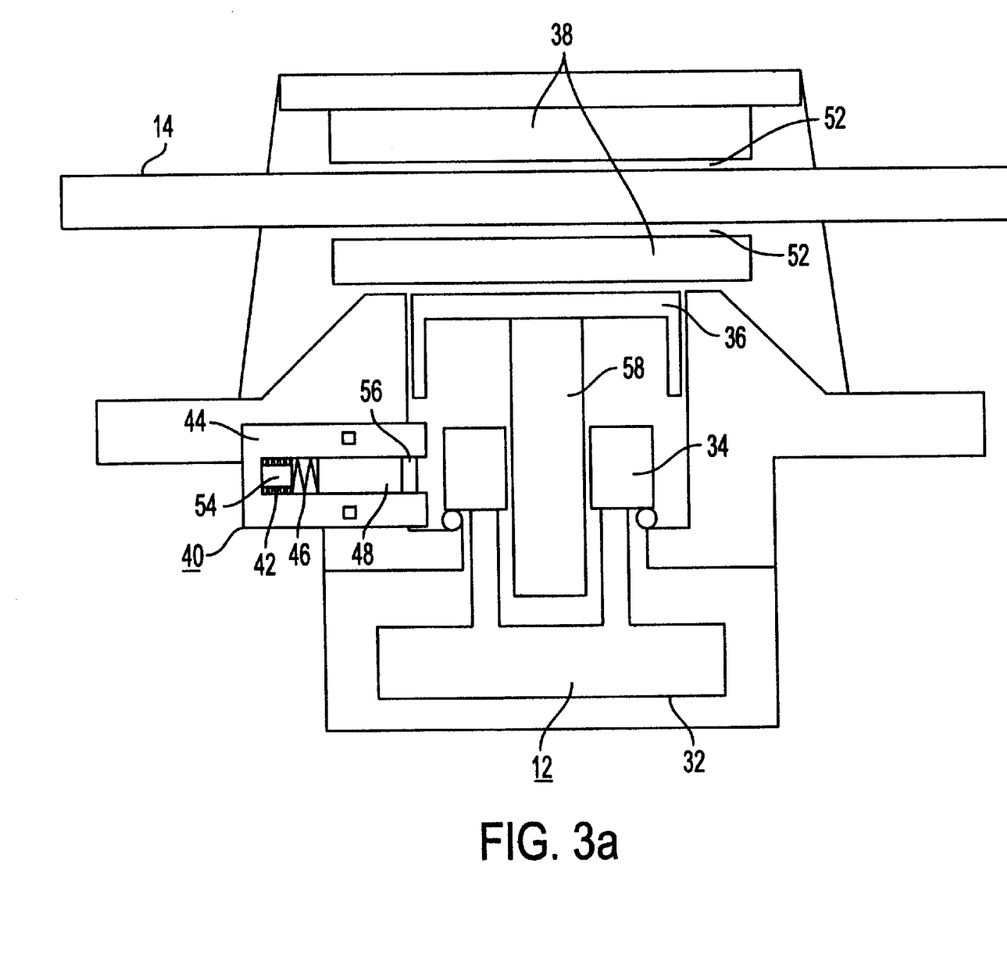
FIGS. 3a and 3b illustrate an immobilizer in a current carrying state and a non-current carrying state, respectively.
Figure 3B:
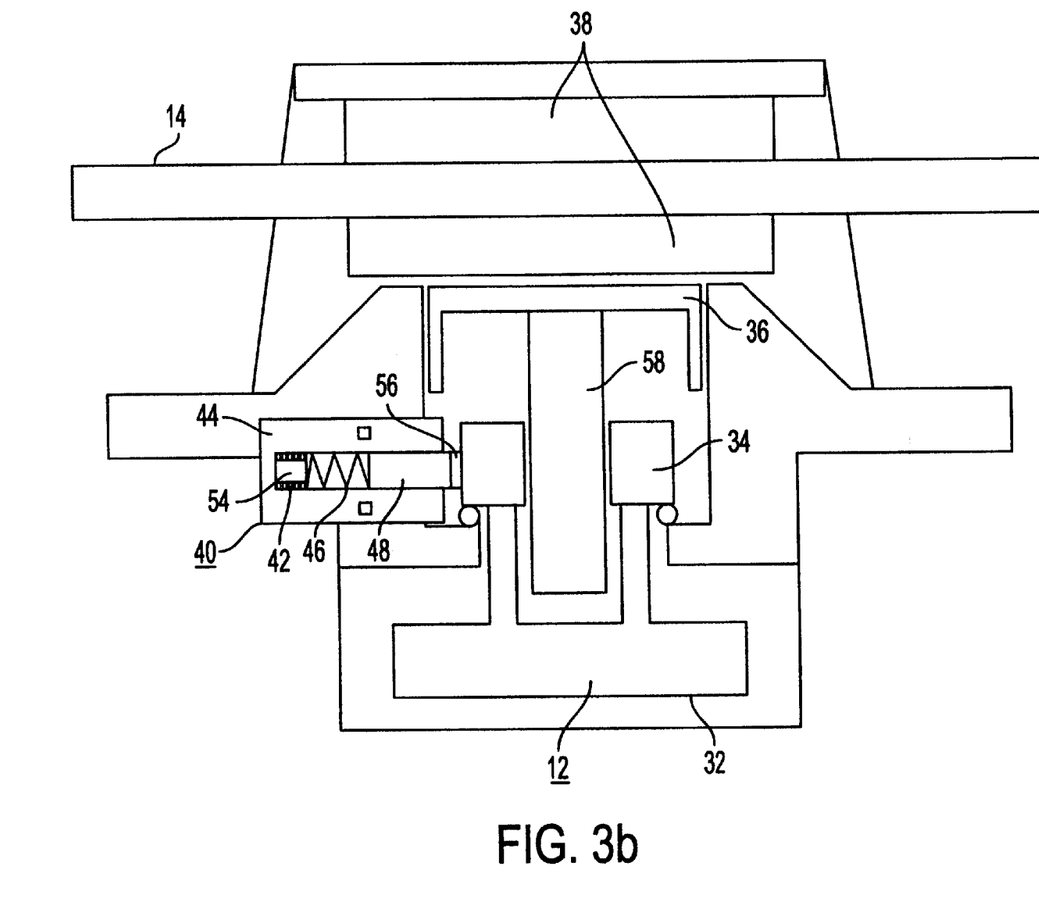

FIGS. 3a and 3b illustrate an exemplary diagram of a drivable and non-drivable state, respectively. Immobilizer 22, e.g., an electrical parking brake, may be constructed to actuate the non-drivable state when in a non-current carrying state and to effectuate a release of the vehicle (into the drivable state) when in a current carrying state. FIG. 3 shows schematic representations of only the components sufficient for the purposes of explanation. The electrical parking brake may be integrated into brake actuator 12. Brake actuator 12 may also include an electromotor 32 for imparting rotational movement on a spindle nut 34 and for imparting axial movement on a spindle rod 58 engaged with spindle nut 34.

Rotational movement of spindle nut 34 may produce axial movement of spindle rod 58 to force brake piston 36 in a direction toward or away from brake disk 14. As a result, during a braking operation, brake linings 38, which may be operatively connected to piston 36, may likewise be imparted with axial movement in a direction toward or away from brake disk 14 through brake linings 38. In a brake actuation, i.e., towards brake disk 14, after traversing an air gap 52, brake linings 38 may abuttingly rest against brake disk 14 to produce a predetermined braking force. After the braking operation, brake linings 38, brake piston 36, the spindle rod 58 may be substantially returned to their initial positions by restoring forces.

In addition to the above-described components of the vehicle braking system, brake actuator 12 may also include an electrical parking brake (brake lock) 40 that may selectively lock disk brake 14. Electrical parking brake 45 may include, e.g., an electromagnetic friction slip coupling. Electromagnetic friction slip coupling may include, e.g., an electromagnet comprising a conductive coil 42 wound around a metal core 54 and may be located within a housing 44 of electrical parking brake 40. Electrical parking brake 40 may also include a metal pin 48, having a friction head 56, that may be supported to axially move within housing 44. Further, a compression spring 46 may be disposed between metal core 54 and metal pin 48 to bias metal core 54 and metal pin 48 away from each other.

FIG. 3a shows brake actuator 12 as a "released" parking brake, i.e., immobilizer 22 is disposed in its "released" (current carrying) state. The "released" state of electrical parking brake 40 may be effected by applying an electric voltage across conductive coil 42 to provide a current therethrough. In operation, if at least one of brake energy storage devices 8 has been shown, e.g., through the exemplary procedure shown in FIG. 2, to have a sufficient charging state when the vehicle is started, control device 20 may effectuate the application of electric voltage to brake actuators 12 to actuate the electromagnet.

When the electromagnet is actuated via current flow through conductive coil 42, metal pin 48 may be attracted toward the electromagnet and pulled into housing 44. The magnetic attraction of the conductive coil 42 to metal pin 48 is sufficient to overcome the spring force of spring 46. In the "released" state, electrical parking brake 40 does not hinder the rotational movement of spindle nut 34, thus, enabling the actuation or resetting of brake linings 38 and brake pistons 36.

FIG. 3b shows brake actuator 12 located in a locked state, i.e., the immobilizer 22 is in its active state. Preferably, the active state of immobilizer 22 may be automatically enabled when the vehicle is turned off.

In the "released" electrical parking brake, brake actuator 12 may be actuated until brake linings 38 abuttingly rest against brake disk 14. As discussed above, the actuation of brake actuator 12 may be carried out, for example, by control device 20 when the vehicle is shut off. While maintaining this state, electrical parking brake 40 may be switched over from the current carrying "released" state into the non-current carrying "locked" or "set" state. The braking system may also be located in the locked state by actuation of by control device 20 when the vehicle is shut off, i.e., while brake linings 38 are abuttingly resting against brake disk 14. The action of the electromagnet may then cancelled by control device 20, i.e., the voltage may be removed from conductive coil 42. Upon the cessation of the magnetic attraction between conductive coil 42 and metal pin 48, compression spring 46 may bias metal pin 48 (and friction head 56) outward, i.e., toward spindle nut 34. The outward biased force exerted on metal pin 48 against spindle nut 34 may produce a friction force that is greater than the restoring force of brake linings 38 or the spindle rod 58. Thus, the braking system will remain in the locked position until an outside force, e.g., via control device 20, releases the brakes.

Thus, brake linings 38 may be locked in their position even when electromotor 32 is not being driven and, consequently, brake linings 38 may also immobilize brake disks 14.

It is noted that the foregoing examples have been provided merely for the purpose of explanation and are in no way to be construed as limiting of the present invention. While the invention has been described with reference to a preferred embodiment, it is understood that the words which have been used herein are words of description and illustration, rather than words of limitation. Changes may be made, within the purview of the appended claims, as presently stated and as amended, without departing from the scope and spirit of the invention in its aspects. Although the invention has been described herein with reference to particular means, materials and embodiments, the invention is not intended to be limited to the particulars disclosed herein; rather, the invention extends to all functionally equivalent structures, methods and uses, such as are within the scope of the appended claims. For example, the present invention may utilize a higher or lower number of press gaps depending on the specific need.

Reference Numeral List

| | |
|---|---|
| 2 | brake pedal |
| 4 | lines |
| 6 | control unit for brake actuators |
| 8 | brake energy storage device (battery) |
| 10 | wiring system |
| 12 | brake actuators |
| 14 | brake disk |
| 16 | wheel |
| 18 | charge state sensor |
| 20 | control device |
| 22 | immobilizer |
| 24 | sensor |
| 26 | lines |
| 28 | lines |
| 30 | lines |
| 32 | electromotor |
| 34 | spindle nut |
| 36 | brake piston |
| 38 | brake lining |
| 40 | electrical parking brake, e.g., an electrical metal friction slip coupling |
| 42 | conductive coil |
| 44 | housing of friction slip coupling |
| 46 | compression spring |
| 48 | metal pin |
| 52 | air gap |
| 54 | metal core |
| 56 | friction head |
| 58 | spindle rod |

What is claimed is:

1. A process for starting a motor vehicle having a braking system that utilizes brake actuation energy at least partially supplied by at least one brake energy storage device, the process comprising:

automatically transferring the motor vehicle into a non-drivable state;

checking a charging state of the at least one brake energy storage device; and transferring the vehicle into a drivable state if a measured charging state of the at least one brake energy storage device is greater than or equal to a predetermined minimum charging state.

2. The process for starting a motor vehicle according to claim 1, said process further comprising:

recharging the at least one brake energy storage device comprising an insufficient charging state; and rechecking the charging state of the at least one brake energy storage device; and transferring the vehicle into the drivable state if the rechecked charging state of the at least one brake energy storage device has at least equalled the predetermined minimum charging state.

3. The process for starting a motor vehicle according to claim 2, the transferring of the vehicle into the drivable state comprising:

switching an immobilizer device from a current carrying state into a non-current carrying state.

4. The process for starting a motor vehicle according to claim 3, wherein the immobilizer device comprises an electrical parking brake that automatically switches into the non-current carrying state when the vehicle is shut off.

5. The process for starting a motor vehicle according to claim 3, wherein the immobilizer comprises a transmission lock that automatically switches into the non-current carrying state when the vehicle is shut off.

6. A vehicle having a brake system comprising:

at least one brake energy storage device adapted to provide at least partial braking energy to the brake system;

a testing device to check a charging state of the at least one brake energy storage device;

a switching device to automatically switch the vehicle into a non-drivable state; and a control device to compare a charging state of the at least one brake energy storage device with a stored predetermined minimum charging state and to actuate a switch over of the switching device to a drivable state when the measured charging state of the at least one brake energy storage devices is greater than or equal to the predetermined minimum charging state.

7. The vehicle according to claim 6, the switching device comprising an immobilizer that automatically switches from a current carrying state into a non-current carrying state when the vehicle is shut off.

8. The vehicle according to claim 7, the immobilizer comprising one of an electrical parking brake and a transmission lock.

9. A method for disabling a brake lock in a motor vehicle upon stating of the motor vehicle, the brake lock being actuated prior to starting of the motor vehicle and the motor vehicle including at least one brake energy storage device and a control device, said method comprising:

measuring a charging state level of the at least one brake energy storage device;

comparing the measured charging state level to a predetermined minimum charging state level; and disabling the brake lock when the measured charging state level is at least equal to the predetermined minimum charging state level.

10. The method according to claim 9, wherein, after the comparing of the measured charging state level, when the measured charging state level of the at least one brake energy storage device is less than the predetermined minimum charging state level, said method further comprising;

recharging the at least one brake energy storage device;

measuring the recharged charging state level;

comparing the recharged charging state level to the predetermined minimum charging state level; and disabling the brake lock when the recharged charging state level is at least equal to the predetermined minimum charging state level.

11. The method according to claim 9, said method further comprising:

disabling the brake lock when the measured charging state level is at least equal to the predetermined minimum charging state level.

12. The method according to claim 9, the disabling of the brake lock comprising:

applying a predetermined voltage to the brake lock;

reducing a friction force applied to a brake actuator; and releasing a brake disk.

13. The method according to claim 12, wherein the brake lock comprises an electromagnetic friction slip coupling device having a friction head, and the reducing of the friction force comprises withdrawing the friction head from a spindle nut.

14. The method according to claim 13, wherein, once the brake lock has been disabled, the brake lock remains disabled until the motor vehicle is turned off.

15. The method according to claim 9, the method further comprising:

initially actuating the brake lock by turning off the motor vehicle.

16. A motor vehicle having a braking system that includes a brake lock that is enabled when starting the motor vehicle, and the motor vehicle being locked until the brake lock is disabled, the vehicle comprising:

a switching device coupled to the brake lock that enables and disables the brake lock;

at least one brake battery;

a charging state measuring device for measuring a charging state level of the at least one brake battery;

a control device that compares the measured charging state level to a predetermined minimum charging state level; and a control device coupled to the switching device for transmitting a control signal to the switching device to one of enable and disable the brake lock.

17. The motor vehicle according to claim 16, the control device comprising a comparator and the switching device comprising an electromagnetic friction slip coupling device having a coil.

18. The motor vehicle according to claim 17, the switching device being disabled by a current applied to the coil.

19. The motor vehicle according to claim 16, further comprising a recharging device that recharges the at least one brake battery having a charging state level below the predetermined minimum charging level.

20. The motor vehicle according to claim 16, the brake lock comprising an electromagnetic device having friction head and a spindle nut, wherein during enabling of the brake lock, the friction head is spring biased against a surface of the spindle nut to restrict movement thereof, and wherein during disabling of the brake lock, the friction head is biased toward the electromagnetic device to allow unrestricted movement of the spindle nut.

21. A process in accordance with claim 1, the at least one brake energy storage device comprising a plurality of brake energy storage devices, and said process further comprising:

checking a charging state of each of the plurality of brake energy storage devices; and transferring the vehicle into a drivable state if a measured charging state of at least one of the plurality of brake energy storage devices is greater than or equal to a predetermined minimum charging state.

22. The process for starting a motor vehicle according to claim 1, the at least one brake energy storage device comprising a plurality of brake energy storage devices, and said process further comprising:

recharging each of the plurality of brake energy storage devices having an insufficient charging state; and rechecking the charging state of each of the plurality of brake energy storage devices; and transferring the vehicle into the drivable state if the rechecked charging state of at least one of the plurality of brake energy storage devices has at least equalled the predetermined minimum charging state.

23. The vehicle according to claim 6, the at least one brake energy storage device comprising a plurality of brake energy storage devices adapted to provide at least partial braking energy to the brake system;

a testing device to check a charging state of the plurality of brake energy storage devices; and a control device to compare a charging state of each of the plurality of brake energy storage devices with a stored predetermined minimum charging state and to actuate a switch over of the switching device to a drivable state when the measured charging state of at least one of the plurality of brake energy storage devices is greater than or equal to the predetermined minimum charging state.

24. The method according to claim 9, the at least one brake energy storage device comprising a plurality of brake energy storage devices, and said method comprising:

measuring a charging state level of each of the plurality of brake energy storage devices;

comparing each of the measured charging state level to a predetermined minimum charging state level; and disabling the brake lock when at least one of the measured charging state levels is at least equal to the predetermined minimum charging state level.

25. The method according to claim 9, wherein, after the comparing of the measured charging state level, when the measured charging state level of each of the plurality of brake energy storage devices is less than the predetermined minimum charging state level, said method further comprising:

recharging each of the brake energy storage device;

measuring each of the recharged charging state level;

comparing each of the recharged charging state level to the predetermined minimum charging state level; and disabling the brake lock when at least one of the recharged charging state levels is at least equal to the predetermined minimum charging state level.

26. The method according to claim 9, said method further comprising:

disabling the brake lock when each of the measured charging state levels is at least equal to the predetermined minimum charging state level.

27. The motor vehicle according to claim 16, the at least one brake battery comprising a plurality of brake batteries; and a charging state measuring device for measuring a charging state level of each of the plurality of brake batteries.

28. The motor vehicle according to claim 16, further comprising a recharging device that recharges any of the plurality of brake batteries having a charging state level below the predetermined minimum charging level.

* * * * *